July 12, 1949.                         J. L. BROTHERS                         2,475,941
                                    SOLDERING IRON HOLDER
                                    Filed Sept. 30, 1944
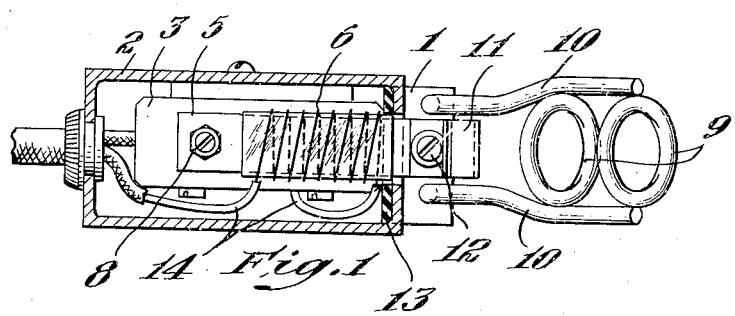
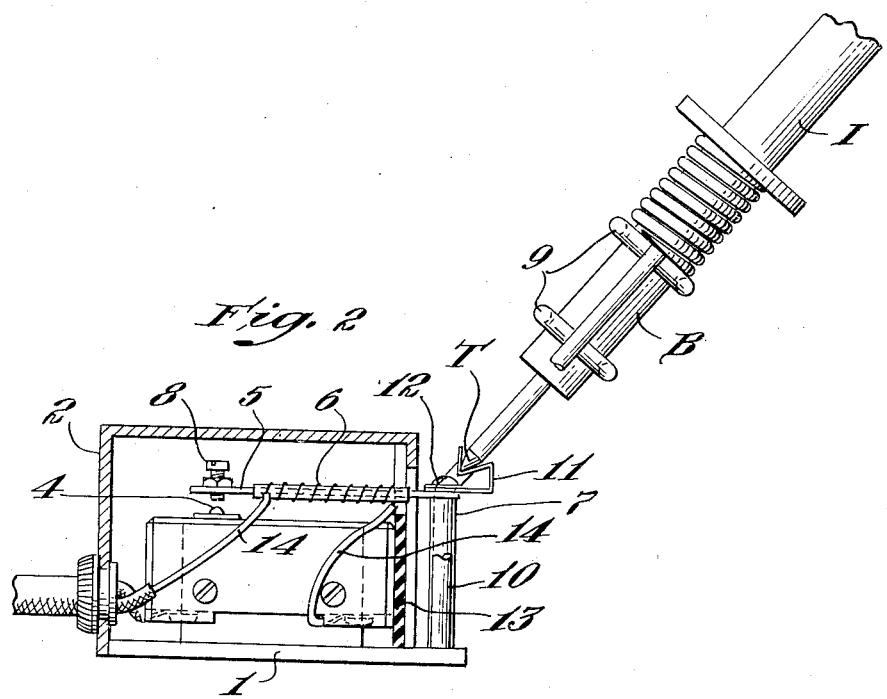
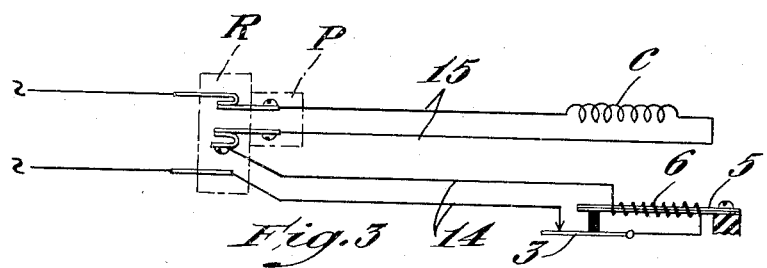
Inventor
John L. Brothers
by Roberts, Cushman & Grover
Att'ys Patented July 12, 1949

2,475,941

UNITED STATES PATENT OFFICE 2,475,941

SOLDERING IRON HOLDER

John L. Brothers, Marblehead, Mass., assignor to Consolidated Electric Lamp Company, Lynn, Mass., a corporation of Massachusetts Application September 30, 1944, Serial No. 556,567

5 Claims. (Cl. 219—26)

In the art of soldering iron holders many attempts have been made to provide a holder which will closely regulate the temperature of the soldering iron, the holders usually comprising a rest for the iron and a thermostatic switch responsive to the heat of the iron when the iron is placed in the holder, the switch being connected in series with the heating coil for the iron so that the heating circuit is opened by the switch in response to heat from the iron. However the holders of the prior art have not been satisfactory for various reasons. Sometimes the thermostatic switch opens too soon causing the iron to be too cool to function satisfactorily and sometimes the switches open too late resulting in overheating and burning off of the tin on the tip of the iron. In short it has not been possible to obtain close regulation of the temperature of the iron, particularly in the case of small irons having a long shank for conducting the heat from the heating coil in the handle to the tip on the end of the shank.

Objects of the present invention are to provide a soldering iron holder which will effect close temperature regulation of a soldering iron, even in the case of a small iron having a long shank as aforesaid, which is simple and economical in construction and which is durable and reliable in use.

According to the present invention the holder is provided with a heat-conducting contact for the tip of the soldering iron and a partition between the thermostat and contact to obstruct radiation of heat from the iron to the thermostat while the tip is in engagement with the contact, in combination with means extending from the contact through the partition to operate the thermostat in response to the heat of the tip. By placing the tip in engagement with the heat-conducting contact the effect of the heat in the tip of the iron may be transmitted to the thermostat directly and quickly, and by placing a partition between the thermostat and contact the radiation of heat from the iron to the thermostat is obstructed. Thus the thermostat responds quickly to the temperature of the tip with substantially no interference from convection or radiation of heat from the heater to the thermostat independently of the heat transmitted through the shank to the tip.

In a more specific aspect the improved holder preferably comprises one or more of the following features. Instead of inserting the iron into a holder which is more or less enclosed, the iron is supported in the open so that the thermostat is not substantially affected by radiation or convection from the iron heater, the amount of heat reaching the tip being substantially no greater when the iron is in the holder than when it is removed from the holder. To facilitate the conduction of heat from the tip to the thermostat the contact is preferably tinned. Moreover the contact preferably is provided with a recess to receive the tip of the iron, the recess containing molten tin so that heat flows from the tip to the contact with substantially no resistance. Also the holding means is preferably arranged above the contact to cause the tip to be pressed against the contact by the weight of the iron, in which case the aforesaid recess is directed upwardly to receive the tip and to hold the tin therein.

For the purpose of illustration a typical embodiment is shown in the accompanying drawings in which Fig. 1 is a top plan view showing the casing in section;

Fig. 2 is a side view showing the casing in section; and

Fig. 3 is a circuit diagram.

The particular embodiment of the invention chosen for the purpose of illustration comprises a base 1, a casing 2, a micro-switch 3 having an operating plunger 4, a thermostat 5 mounted on a post 7 with an adjustable screw 8 for engagement with the plunger 4, a holder 9 to receive the iron and a heat-conducting contact 11 having an upwardly directed recess to fit the tip of the iron when supported in the holder 9, the contact comprising a bent strap mounted in face to face contact with the thermostat 5 by means of a screw 12. The thermostat 5 comprises a bimetallic strip surrounded by a layer of insulation on which heating wire 6 is wound. The holder 9 comprises two wire circles mounted on two wire uprights 10 which in turn are mounted on the base 1. The casing 2 is provided with a slot so that the casing may be removed without removing the thermostat. A sheet of insulation 13 is placed between the switch 3 and the end of the casing to cover most of the slot. As shown in Figs. 1 and 2 the holder 9 is made of wire in open formation to permit free radiation and convection from the heater in the body B of the iron I when the iron is supported in the holder. Thus the tip T of the iron receives substantially no more heat from the heater by radiation and convection when the iron is in the holder than when the iron is removed from the holder. For use with small soldering irons the thermostat 5 should be small so that it will heat and cool quickly.

As shown in Fig. 2 the contact 11 is preferably mounted in direct engagement with the thermostat 5 so that the path from the contact 11 to the thermostat is as short as possible. In this way loss of heat in transit from the tip to the thermostat is reduced. The post 7 upon which the thermostat and tip are mounted may also be formed of insulation material so as not to draw off a substantial amount of heat in transit from the tip to the thermostat.

As shown in Fig. 3 the switch 3 and heating wire 6 are connected in series with the heating coil C in the body B of the iron I so that the iron is heated when the switch 3 is closed, the heating wire 6 serving as a booster in well-known manner to effect closer regulation of the temperature of the iron. To facilitate connection of the iron and holder the conductors 14 of the holder are connected to a receptacle R into which the conductors 15 of the iron may be connected by a plug P.

With the parts connected as aforesaid the switch 3 is normally closed to supply current to the coil C. While the iron is in use heat is withdrawn from the tip at about the same rate as it is supplied to the tip from the coil C. However when the iron is not in use heat is supplied at a somewhat faster rate than needed, so that the tip tends to overheat. However when the iron is placed in the holder heat flows quickly from the tip through the tinned contact 11 and thence through the very short path to the thermostat, causing the thermostat to flex downwardly and open the switch 3 by engagement with the plunger 4. This opens the circuit of the heating coil C and stops the supply of heat. As the tip T cools thermostat 5 flexes upwardly to permit the switch to close. Owing to the aforesaid characteristics of the present invention the thermostat 5 responds very quickly to the temperature of the tip T and the thermostat is controlled solely by the temperature of the tip T without substantial interference from heat reaching the thermostat by conduction, radiation or convection except by conduction through the contact 11.

It should be understood that the present disclosure is for the purpose of illustration only and that this invention includes all modifications and equivalents which fall within the scope of the appended claims.

I claim:

1. A soldering iron holder comprising a thermostat, means for connecting the thermostat in circuit with the iron heater and a source of current, a heat-conducting contact for the tip of a soldering iron, a holder for holding a soldering iron with its tip in heat-conducting engagement with said contact, a partition between the thermostat and contact to obstruct radiation of heat from the heater to the thermostat while said tip is in engagement with said contact, and a conductor extending from said contact through the partition to operate the thermostat in response to the heat of the tip, said contact being tinned to make good heat-conducting engagement with the iron tip.

2. A soldering iron holder comprising a thermostat, means for connecting the thermostat in circuit with the iron heater and a source of current, a heat-conducting contact for the tip of a soldering iron, a holder for holding a soldering iron with its tip in heat-conducting engagement with said contact, a partition between the thermostat and contact to obstruct radiation of heat from the heater to the thermostat while said tip is in engagement with said contact, and a conductor extending from said contact through the partition to operate the thermostat in response to the heat of the tip, said contact having a recess to receive the tip of the iron and the recess being tinned to make good heat-conducting engagement with the iron tip.

3. A soldering iron holder comprising a thermostat, means for connecting the thermostat in circuit with the iron heater and a source of current, a heat-conducting contact for the tip of a soldering iron, means for holding a soldering iron with its tip in heat-conducting engagement with said contact, a partition between the thermostat and contact to obstruct radiation of heat from the heater to the thermostat while said tip is in engagement with said contact, and means extending from said contact through the partition to operate the thermostat in response to the heat of the tip, said holding means being arranged above the contact to cause the tip to be pressed against the contact by the weight of the iron.

4. A soldering iron holder comprising a thermostat, means for connecting the thermostat in circuit with the iron heater and a source of current, a heat-conducting contact for the tip of a soldering iron, means for holding a soldering iron with its tip in heat-conducting engagement with said contact, a partition between the thermostat and contact to obstruct radiation of heat from the heater to the thermostat while said tip is in engagement with said contact, and means extending from said contact through the partition to operate the thermostat in response to the heat of the tip, said contact having a recess to receive the tip of the iron, and said holding means being arranged above the contact to cause the tip to be pressed into said recess by the weight of the iron.

5. A soldering iron holder comprising a thermostat, means for connecting the thermostat in circuit with the iron heater and a source of current, a heat-conducting contact for the tip of a soldering iron, means for holding a soldering iron with its tip in heat-conducting engagement with said contact, a partition between the thermostat and contact to obstruct radiation of heat from the heater to the thermostat while said tip is in engagement with said contact, and means extending from said contact through the partition to operate the thermostat in response to the heat of the tip, said iron heater being disposed in the open when the iron is on the holding means so the amount of heat then reaching the tip by radiation and convection from the heater is substantially no greater than when the iron is removed from the holding means, said contact having a recess to receive the tip of the iron and the recess being tinned to make good heat-conducting engagement with the iron tip, said holding means being arranged above the contact to cause the tip to be pressed into said recess by the weight of the iron.

JOHN L. BROTHERS.

REFERENCES CITED

The following references are of record in the file of this patent:

UNITED STATES PATENTS

| Number | Name | Date |
| --- | --- | --- |
| 1,010,529 | Stevens | Dec. 5, 1911 |
| 1,150,081 | Trood | Aug. 17, 1915 |
| 2,149,892 | Klahn | Mar. 7, 1939 |
| 2,151,888 | Beach | Mar. 28, 1939 |
| 2,181,042 | Beach | Nov. 21, 1939 |
| 2,224,198 | Shearer | Dec. 10, 1940 |
| 2,228,571 | Kuhn et al. | Jan. 14, 1941 |
| 2,333,207 | Smith | Nov. 2, 1943 |